C. D. PAXSON.
DEMOUNTABLE RIM.
APPLICATION FILED FEB. 1, 1918.

1,364,515. Patented Jan. 4, 1921.
2 SHEETS—SHEET 1.

Inventor
Calvin D. Paxson
by Thurston & Kwis
Attys

C. D. PAXSON.
DEMOUNTABLE RIM.
APPLICATION FILED FEB. 1, 1918.
1,364,515. Patented Jan. 4, 1921.
2 SHEETS—SHEET 2.
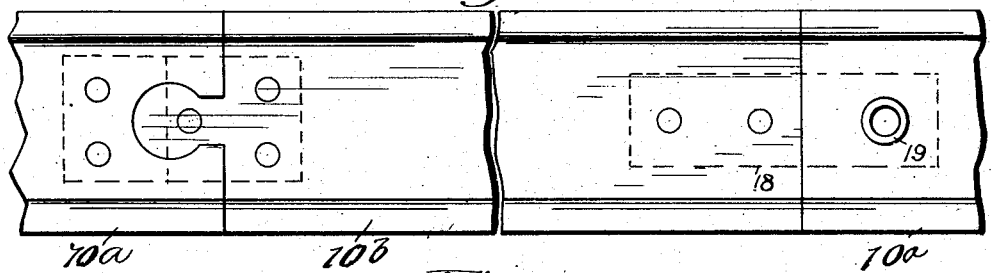
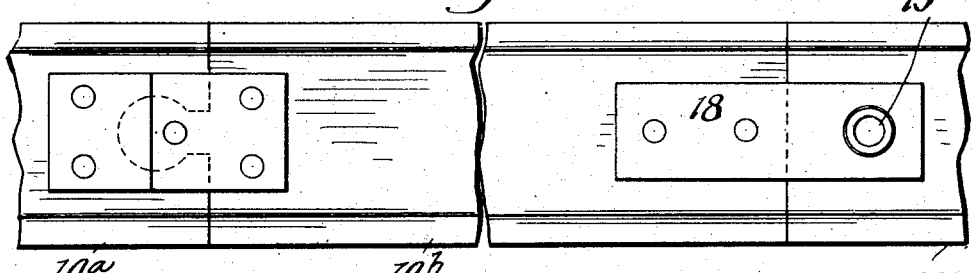
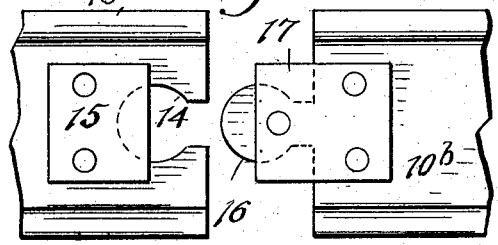 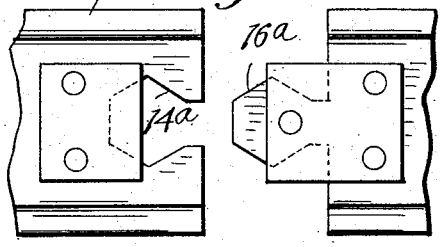
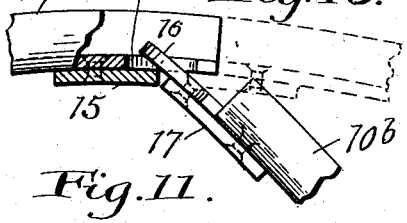 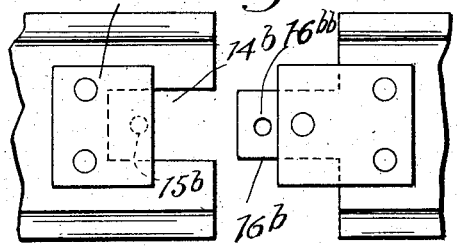
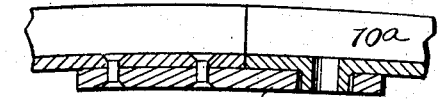
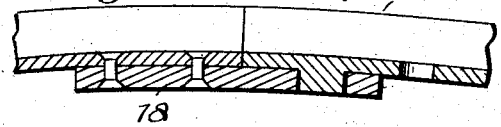
Inventor
Calvin D. Paxson
by Thurston & Kwis
Attys.

UNITED STATES PATENT OFFICE.

CALVIN D. PAXSON, OF CLEVELAND, OHIO.

DEMOUNTABLE RIM.

1,364,515. Specification of Letters Patent. Patented Jan. 4, 1921.

Application filed February 1, 1918. Serial No. 214,958.

*To all whom it may concern:*

Be it known that I, CALVIN D. PAXSON, a citizen of the United States, residing at Cleveland, in the county of Cuyahoga and State of Ohio, have invented a certain new and useful Improvement in Demountable Rims, of which the following is a full, clear, and exact description.

This invention relates to certain improvements in demountable rims for wheels, particularly automobile wheels, and has for its main object to provide a rim construction such that a tire can be quickly applied to or removed from the rim. Still further the invention aims to accomplish this with a construction which eliminates the necessity for movable locking or latching devices such as screws, levers, pivoted latches, or equivalent movable fastening devices.

These objects are attained by the present invention by the provision of a novel construction of rim having a major section and a minor section which is bodily removable from the major section, these two sections having parts which are adapted to interfit or interlock in such a manner that the necessity for movable locking, latching or holding devices is entirely eliminated.

My invention may be briefly summarized as consisting in certain novel details of construction and combinations and arrangements of parts which will be described in the specification and set forth in the appended claims.

Figure 1:
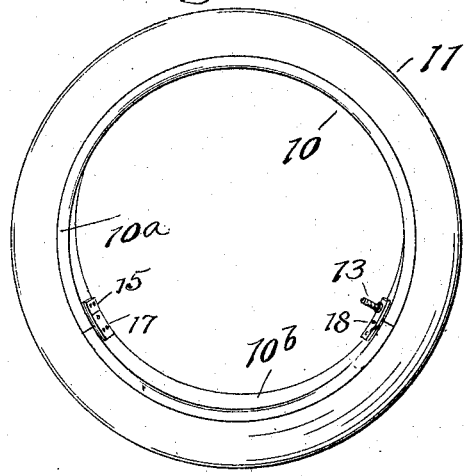
Figure 2:
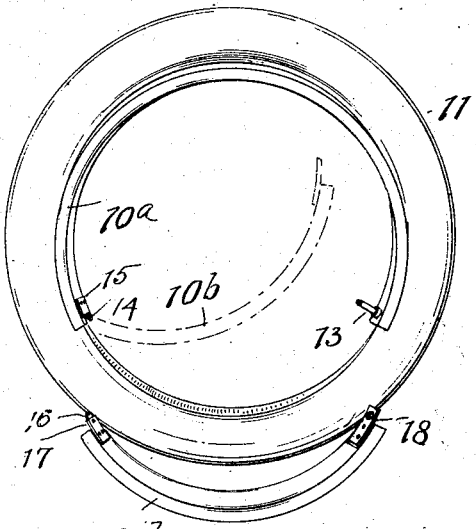
Figure 3:
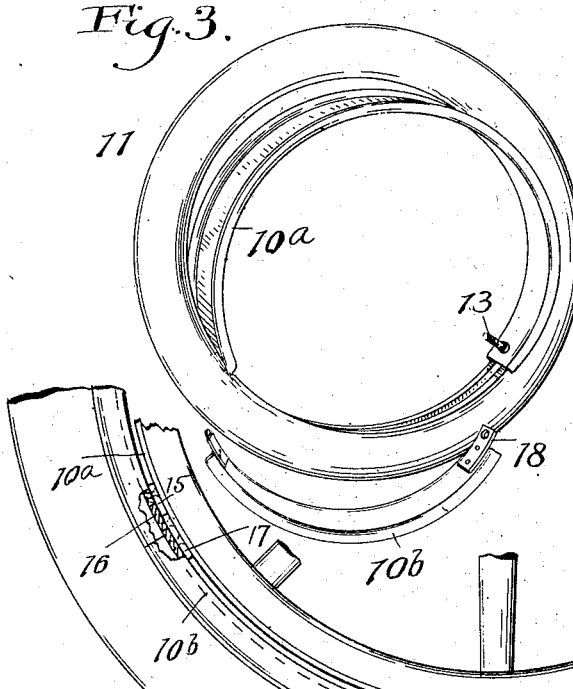
Figure 4:
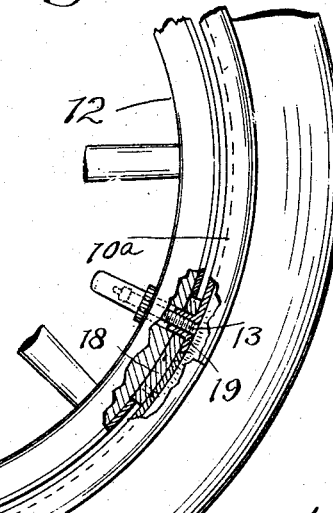

In the accompanying sheets of drawings, Figure 1 is a perspective view of a rim constructed in accordance with one embodiment of my invention, the tire being applied to the rim; Fig. 2 is a similar view, but with the relatively short section of the rim detached from the body portion or main section of the rim, and with the main section slightly displaced from normal position with respect to the tire preliminary to swinging it laterally to remove it therefrom; Fig. 3 is a similar view showing how the main section is swung laterally to remove it from the tire; Fig. 4 is a view of a portion of a vehicle wheel with parts in section, showing my improved rim in position thereon; Fig. 5 is a fragmentary outside view on an enlarged scale, showing the minor removable or shorter section and the adjoining ends of the major section, the middle portion of the minor section being removed; Fig. 6 is a similar view looking at the inner side of the rim; Fig. 7 shows the preferred form of special dove-tail interlocking connection between one end of the minor section and the adjacent end of the major section, the two parts being slightly separated endwise; Fig. 8 is a similar view showing a slight modification; Fig. 9 is a similar view showing a further modification; Fig. 10 is a side view with parts in section, showing one end of the major section and the adjoining end of the minor section, these two ends having the special dove-tail interlocking connecting parts, and this view showing the manner in which the interfitting parts are inserted, one within the other, and how the minor section is swung to bring about the locked relationship; Fig. 11 is a fragmentary side view with parts broken away, showing the ends of the minor and major sections opposite to the ends shown in Fig. 10; and Fig. 12 is a similar view showing a slight modification as to the location of the opening for the valve stem.

Referring now to the figures of the drawing in which similar parts are designated by similar reference characters, 10 represents the rim, 11 the tire which is to be seated on the rim, and 12 (Fig. 4) a portion of a vehicle wheel to which the rim and tire are adapted to be applied, and on which the rim is adapted to be held in any desired manner.

The rim 10, which as before stated, is constructed to permit the ready and quick removal from, or application thereto of the tire 11, is composed of a main or major section $10^a$, and a minor section $10^b$, which is wholly or bodily removable from the major section. This minor section is preferably about one-third of the circumference of the rim, *i. e.* about 120° of arcuate length. Of course, the length may be increased or decreased somewhat without materially affecting the efficiency of the rim, but it is important, if not essential, that the major section be not less than four-sevenths, nor greater than three-fourths of the circumference of the rim, and that the minor section be not less than one-fourth and not greater than three-sevenths of the circumference. It is important also, that the valve stem 13 extend through the major section near one end thereof, as clearly shown, for example, in Figs. 2 and 3. The reasons for the necessity or advisability of these features of construction and arrangement will more fully appear from the later description of the manner in which the tire is applied or removed from the rim.

Considering now the detail features of the construction of the rim, as before stated, it is one of the principal objects of this invention to eliminate the necessity for special moving, swinging, or adjustable locking or latching devices such as the pivoted latch of my prior Patent No. 1,223,900, to hold the minor section in proper position with respect to the major section.

I accomplish this by providing between two adjoining ends of the major and minor sections a special interlocking connection which prevents relative movement when the minor section is swung to final position, and at the opposite ends a simple attaching device such as an overlapping cleat, preferably attached to the minor section and engaging a lug or equivalent device on the adjoining end of the major section.

Considering now the embodiment of my invention shown in Figs. 5, 6 and 7, it will be observed that this special interlocking connection is in the form of a special dovetail connection having parts on the two members to be connected, so formed and arranged that the part on one piece can be inserted into an opening of the adjoining piece, with the minor section arranged at an angle to the major section but in the plane of the rim, and when the minor section is swung to normal position these parts dove-tail or interlock and hold against relative movement in any direction until the minor section is again swung back or inward away from normal position.

In carrying out this embodiment referred to, I provide on the end of the major section a slot or notch 14, with an enlarged inner part and relatively narrow neck leading from the enlarged part to the end of the major section. Additionally the major portion has attached to its inner face a plate 15 which covers a portion of the enlarged part of the slot 14 (see particularly Fig. 7). Additionally I provide on the adjoining end of the minor section an extension 16 having an enlarged part of a size to fit into the enlarged part of the slot 14, and a neck leading from said enlarged part to the end of the minor section. In the embodiment under consideration, the enlarged parts of the slot 14 and extension 16 are circular. Additionally the minor section has on its inner side a plate 17 which extends from the end of the minor section and partly covers or overlaps the extension 16.

At the opposite end of the minor section I provide a cleat or equivalent simple holding device 18, said cleat projecting beyond the end of the minor section so it will overlap the adjoining end of the major section, the projecting or extended end having an opening adapted to receive or fit onto a lug 19 suitably positioned on, and projecting from the inner side of the major section.

To attach the two parts constructed as above described, the top of the enlarged part 16 of the extension on the minor section is inserted into the enlarged part 14 of the slot on the major section, with the parts positioned substantially as shown in Fig. 10, i. e. with the minor section extending inwardly, but in the plane of the rim. When the parts are positioned as in Fig. 10, it is then only necessary to swing the minor section outwardly to normal position, whereupon the entire extension 16 on the minor section slips into the slot 14 on the end of the major section, and the two plates 15 and 17 by their engagement respectively with the under side of the major portion of the rim and the under side of the enlarged part of the extension projecting beyond the plate 17, prevent disengagement of the parts, or movement in any direction, i. e. inward or outward movement, or endwise movement, until the section is again swung inward to permit disengagement of the parts.

When the minor section is swung to normal position and the parts are interlocked in the manner above described, the opposite ends of the minor and major sections are caused to snap together, and the opening of the cleat 18 receives the lug 19 near the end of the major section. The parts are now held in their normal operative positions.

It is not essential that the interlocking parts at the left hand side of Figs. 5 and 6 be shaped precisely as shown in said figures. For example, in Fig. 8 the enlarged part of the slot 14$^a$ at the end of the major section is shown as hexagonal, and the extension 16$^a$ on the minor section which is designed to be received in the slot, is similarly shaped.

In Fig. 9 there is still a further modification; a slot designated 14$^b$ being an open slot of equal diameter from end to end. The extension 14$^b$ on the minor section is similarly shaped, but endwise movement between the parts is prevented by the registration of a pin with an opening, the pin being in this case, on the plate 15, and designated 15$^b$, and the opening being in this case on the extension 16$^b$ and designated 16$^{bb}$. Of course the relative locations of the pin and opening can be reversed. Thus it will be seen that when the extension 16$^b$ is inserted into the slot 14$^b$ with the minor section at an angle to the major section, and then when the minor section is rocked to normal position in circumferential alinement with the major section, the pin 15$^b$ will slide into the opening 16$^{bb}$, and the parts will be held from endwise as well as in and out movement, unless the minor section is swung again to disengaging position.

From the above it will be seen that the interlocking parts at one set of ends of the major and minor sections may be variously constructed, it being only essential that they be so formed that the two parts can be placed together with the minor section at an angle to its normal position, and that they subsequently interlock when the minor section is swung to final position so as to prevent accidental disengagement, it being understood that the engagement between the opposite ends of the major and minor sections together with the action of the cleat prevents the accidental swinging of the minor section from normal position until such swinging movement is desired, and in fact, caused in the manner hereinafter referred to.

It has been previously stated that the valve stem should extend through the major section near one end thereof, in order that the major section of the rim can be readily removed from, or applied to the rim in the manner hereinafter described. The valve stem may extend through the lug or stud 19 with which the cleat 18 engages, in which event, of course, the lug will be hollow. This is clearly shown in Fig. 11. It is not necessary, however, that the valve stem extend through the lug 19, but it may pass through a separate opening which is independent of the cleat 18, but preferably located just beyond the end of the same, as shown in Fig. 12.

To remove the tire from the rim, the tire and rim will be positioned as in Fig. 1. Then the tire and rim will be bounced on the floor, and the inward movement of the tire opposite the minor section will cause the minor section to be disengaged and swung inwardly about the special dovetail connecting end as a pivot, the end having the cleat first dis-engaging. The minor section will then drop out of place or can be lifted out by hand. Then the tire is again bounced on the floor while in the position shown in Fig. 2, whereupon the flattening or sagging of the tire into the open space caused by the removal of the minor section will cause the major section to sink or slide down slightly into the tire so that the middle part of the major section is clear of the rim portion of the tire as shown in Fig. 2. Then the operator swings the major portion of the rim laterally as shown in Fig. 3, this swinging movement taking place about the ends of the major section through one of which the valve extends. Then it is a simple matter to lift the major portion of the rim entirely free of the tire.

It will be apparent that this lateral swinging movement depicted in Fig. 3, is permissible by reason of the fact that the valve stem extends through one of the ends of the major section about which the lateral swinging movement takes place, and that the rim could not be so swung if the valve stem extended through some other part of the major section of the rim, such as the middle thereof.

To replace the tire on the rim, the end of the major section, which has the opening for the valve stem, is first set into the tire and the stem is extended through the opening of the rim. Then the major portion is progressively seated within the tire. Then the minor section is placed in position, first by placing the minor section at an angle to the major section, but in the plane of the major section with the extending part of the minor section inserted into the opening at the end of the major section, as shown in Fig. 10, and then the minor section is swung outward about the engaging ends as a pivot until it substantially assumes its normal position. When this is being done, the opening of the cleat passes over the valve stem (assuming that the valve stem passes through the cleat) and then the minor section is snapped into place, with all parts in normal position. These operations of assembling and dis-assembling the parts can be performed quickly and with ease, whereas with demountable rims with which I am familiar, the removal or replacing of the tire requires considerable skill and no little time and labor. The parts of my improved rim can be assembled or dis-assembled, even though they are more or less caked with mud or ice, because there are no swinging, moving or adjusting locking parts or elements which can become frozen or caked with mud or rust into place, and so made difficult to loosen or operate. This is a feature which commends itself very readily to users of demountable rims who have had occasion to place a tire on a rim or to remove the same therefrom under adverse conditions.

The felly of the wheel will, of course, be notched or designed to accommodate the plates 15 and 17 at two adjoining ends of the major and minor sections and also to accommodate the cleat 18 and the boss or lug 19 with which the cleat registers. In fact, these parts can be conveniently employed as friction devices to prevent the creeping of the rim about the felly, and do away with the necessity for special anti-creeping or holding devices.

Other changes in details of construction may suggest themselves to one skilled in the art, and while I have shown only a few of the modifications which may be made, I aim in my claims to cover all changes which do not involve a departure from the spirit and scope of my invention in its broadest aspect.

Having described my invention, I claim:

1. A demountable rim for wheels comprising a major section, and a minor section which is bodily removable therefrom, one end of the major section and one end of the minor section having parts which interlock and hold said ends against relative movement in any direction as long as the opposite ends of the major and minor sections are in normal position, said parts at the first-named ends of the major and minor sections including a slot at one end, a tongue on the other end which is received in the slot, and abutments on the inner side of both ends, one partly overlapping the slot and the other partly overlapping the tongue.

2. A demountable rim for wheels comprising a major section, and a minor section which is bodily removable therefrom, one end of the major section and one end of the minor section having parts formed so as to hold said ends against relative movement in any direction as long as the opposite end of the minor section is in normal position with respect to the corresponding end of the major section, said parts including a dovetail extension and a dovetail slot, one formed in the end of the major section and the other formed in the end of the minor section, and a pair of abutments at said ends of the major and minor sections on the inner sides thereof, and one partly overlapping the slot and the other partly overlapping the tongue.

3. A demountable rim for wheels comprising a major section, and a minor section which is bodily removable therefrom, one end of the major section and the adjacent end of the minor section having parts which interlock and hold said ends against relative movement in any direction as long as the opposite end of the minor section is in normal position with respect to the corresponding end of the major section, said parts including a dovetail slot and a correspondingly shaped dovetail tongue formed on the two parts respectively, and a pair of abutting plates on the inner sides of the major and minor sections, one plate partly overlapping the slot and the other partly overlapping the tongue.

In testimony whereof, I hereunto affix my signature.

CALVIN D. PAXSON.